US010368424B2

(12) United States Patent
Engelen et al.

(10) Patent No.: US 10,368,424 B2
(45) Date of Patent: Jul. 30, 2019

(54) LIGHTING SYSTEM, LIGHTING DEVICE AND LIGHTING SYSTEM CONFIGURATION METHOD

(71) Applicant: PHILIPS LIGHTING HOLDING B.V., Eindhoven (NL)

(72) Inventors: Dirk Valentinus Rene Engelen, Heusden-Zolder (BE); Philip Steven Newton, Waalre (NL); Dzmitry Viktorovich Aliakseyeu, Eindhoven (NL); Jochen Renaat Van Gheluwe, Lommel (BE); Ramon Antoine Wiro Clout, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/780,053

(22) PCT Filed: Nov. 24, 2016

(86) PCT No.: PCT/EP2016/078619
§ 371 (c)(1),
(2) Date: May 30, 2018

(87) PCT Pub. No.: WO2017/093103
PCT Pub. Date: Jun. 8, 2017

(65) Prior Publication Data
US 2018/0352636 A1 Dec. 6, 2018

(30) Foreign Application Priority Data
Dec. 1, 2015 (EP) .................................... 15197164

(51) Int. Cl.
*H05B 37/02* (2006.01)
*H05B 33/08* (2006.01)
(Continued)

(52) U.S. Cl.
CPC ..... *H05B 37/0272* (2013.01); *H05B 33/0863* (2013.01); *H05B 37/0245* (2013.01); *H04W 4/38* (2018.02); *H04W 52/02* (2013.01)

(58) Field of Classification Search
CPC ..... H05B 37/0272; H04W 52/02; H04W 4/38
See application file for complete search history.

(56) References Cited

U.S. PATENT DOCUMENTS 7,242,152 B2  7/2007 Dowling et al.
8,788,098 B2  7/2014 Sekulovski et al.
(Continued)

FOREIGN PATENT DOCUMENTS

EP  1870802 A1  12/2007
WO  2009104121 A2  8/2009
WO  2014100832 A2  6/2014

OTHER PUBLICATIONS

Dragan Sekulovski, Chapter 5 in "Studies in Ambient Intelligent Lighting", PhD thesis, Eindhoven University of Technology, the Netherlands, 2013.

*Primary Examiner* — Thuy V Tran

(57) ABSTRACT

A lighting system is disclosed for deploying dynamic lighting effects. The lighting system includes a plurality of lighting devices, each lighting device being adapted to deploy a portion of a dynamic lighting effect, a controller and a network communication module, each lighting device is communicatively coupled in a mesh network to at least one neighboring lighting device and adapted to communicate illumination state information to the at least one neighboring lighting device and a system controller adapted to broadcast a configurable dynamic lighting effect function to the plurality of lighting devices, said configurable dynamic lighting effect function defining the dynamic lighting effect to be deployed by the lighting system, wherein at least some of the plurality of lighting devices' respective controllers are (Continued)

adapted to configure the lighting device by configuring the configurable dynamic lighting effect function based on illumination state information received from at least one of the at least some of the plurality of lighting devices' neighboring lighting devices to facilitate deployment of its portion of the dynamic lighting effect, determining the at least some of the plurality of lighting devices' illumination state information from the configured configurable dynamic lighting effect function and communicating the determined illumination state information to at least one of the at least some of the plurality of lighting devices' neighboring lighting devices.

15 Claims, 6 Drawing Sheets

(51) Int. Cl.
  *H04W 52/02* (2009.01)
  *H04W 4/38* (2018.01)

(56) References Cited

U.S. PATENT DOCUMENTS

| | | |
|---|---|---|
| 2011/0302282 A1 | 12/2011 | Dadlani et al. |
| 2014/0309029 A1 | 10/2014 | Schrementi et al. |
| 2014/0354160 A1* | 12/2014 | Aggarwal .......... H05B 37/0227 315/152 |
| 2016/0286627 A1* | 9/2016 | Chen .................. H05B 37/0245 |
| 2018/0255627 A1* | 9/2018 | Aggarwal ............... H04W 4/70 |

* cited by examiner multi-domain wireless mesh network 101, 102, 103

LIGHTING SYSTEM, LIGHTING DEVICE AND LIGHTING SYSTEM CONFIGURATION METHOD

CROSS-REFERENCE TO PRIOR APPLICATIONS

This application is the U.S. National Phase application under 35 U.S.C. § 371 of International Application No. PCT/EP2016/078619, filed on Nov. 24, 2016 which claims the benefit of European Patent Application No. 15197164.5, filed on Dec. 1, 2015. These applications are hereby incorporated by reference herein.

FIELD OF THE INVENTION

The present invention relates to a lighting system for deploying dynamic lighting effects, the lighting system comprising a plurality of lighting devices, each lighting device being adapted to deploy a portion of a dynamic lighting effect and comprising a controller including a network communication module; and a system controller.

The present invention further relates to a lighting device for such a lighting system.

The present invention further relates to a method for configuring the deployment of a dynamic lighting effect on such a lighting system.

BACKGROUND OF THE INVENTION

Lighting systems comprising a plurality of lighting devices acting as nodes in a network of such devices under control of a system controller are well-known. Such systems for instance may be deployed to create dynamic light effects in order to create an appealing aesthetic effect in a space in which the lighting system is deployed. For example, such a lighting system may comprise a plurality of lighting nodes in which the individual nodes are connected in a bus, e.g. a DMX or DALI bus, or a daisy chain architecture for power and control delivery by the system controller. The locations of the lighting nodes in such a lighting system may be known to facilitate straightforward mapping of the addresses of the respective nodes to their locations. Another example of such a lighting system are so-called SWARM architectures in which lighting effects may jump from node to node under control of a system controller, which typically requires knowledge of the location of the respective lighting devices in the space in which the lighting system is deployed.

An example of such an architecture is provided in WO 2014/100832 A2, which discloses a lighting system operable as a patterning system. The system includes transportable nodes, each having a unique identifier, and including an element having first and second states and a transceiver for receiving an element command signal. A transmitter sends a query command to the transportable nodes to validate the identifier against the database and activate validated transportable nodes to receive the signal. A controller sends the signal to activated transportable nodes to bring the plurality of nodes into one of their states to form a pattern. The controller can send pattern data to the transportable nodes, where each acts as a discrete part of an image array comprised of the transportable nodes, with each brought into one of its states in response to respective pattern data to create a pattern.

It is however not necessary that the location of the individual lighting nodes in the lighting system are known; examples of lighting systems for deploying dynamic lighting effects based on wearable and/or battery-powered lighting nodes having variable locations are also known although the dynamic lighting effects that can be created with such systems are of course more limited.

A characteristic shared by such lighting systems is that the bandwidth between the system controller and the various lighting devices under its control is typically limited. This can pose problems in deployment scenarios where the lighting system is to render highly dynamic lighting content, as this typically requires large amounts of configuration data to be transmitted over the links between the system controller and the various lighting devices for which the bandwidth of these links is insufficient.

Patent application EP 1870802 A1 relates to a method for communicating data suitable for use with a plurality of persons grouped within a geographical area, each person being at a location within the geographical area. The method comprises providing a plurality of persons with an individual lighting module, and communicating data to each of the lighting modules. The data communicated relates to an image to be displayed by a combination of the lighting modules. The data is thus pixelated data in an image. The image is provided from an image source such as an image generator and parts of the image are distributed among the individual lighting modules, e.g. via wireless communication. The method may furthermore comprise determining the position of the individual lighting modules before communicating data to each of the lighting modules, so as to correctly generate the image. The lighting modules may comprise a data communicator for receiving data from and transmitting data to nearby lighting modules. The lighting modules may be adapted for displaying video information. The display system may be arranged with synchronization means to form a substantially real-time system to display video.

SUMMARY OF THE INVENTION

The present invention seeks to provide a lighting system requiring a reduced bandwidth between its system controller and its lighting devices for the deployment of dynamic lighting effects.

The present invention further seeks to provide a lighting device for use in such a lighting system.

The present invention yet further seeks to provide method of configuring a lighting system for deploying dynamic lighting effects that requires less bandwidth between the system controller and the respective lighting devices for such configuration.

According to an aspect, there is provided a lighting system for deploying dynamic lighting effects, the lighting system comprising a plurality of lighting devices, each lighting device being adapted to deploy a portion of a dynamic lighting effect and comprising a controller and a network communication module, the respective lighting devices being interconnected in a mesh network through their respective network communication modules such that each lighting device is communicatively coupled to at least one neighboring lighting device and adapted to communicate illumination state information to the at least one neighboring lighting device; and a system controller communicatively coupled to the mesh network and adapted to broadcast a configurable dynamic lighting effect function to the lighting devices in the mesh network, said dynamic lighting effect function defining the dynamic lighting effect to be deployed by the lighting system; wherein the respective controllers of at least some of the lighting devices in the mesh network are adapted to configure the lighting device by extrapolating configuration information for configuring the configurable dynamic lighting effect function to facilitate deployment of its portion of the dynamic lighting effect from illumination state information received from at least one of its neighboring lighting devices; determining its illumination state information from the extrapolated configuration information; and communicating the determined illumination state information to at least one of its neighboring lighting devices.

Hence, the lighting system of the present invention relies on more limited communication between the system controller and the various lighting devices in the lighting system as the various lighting devices in the lighting system are configured to locally configure the configurable dynamic lighting effect function based on individual lighting state information communicated between neighbouring lighting devices, which individual lighting state information is used by the controllers of the lighting devices to synchronise the respective luminous outputs of the lighting devices such that the overall luminous output of the lighting system complies with the deployed configurable dynamic lighting effect function. The synchronisation of the various lighting devices in the lighting system in accordance with the deployed configurable dynamic lighting effect function can be achieved by local synchronisation information rippling through the lighting system due to controllers receiving lighting state information from an upstream neighbour and communicating its own lighting state information to a downstream neighbour in the ripple synchronisation.

The respective controllers of at least some of the lighting devices in the mesh network may be adapted to configure the lighting device in response to a controller of a master lighting device generating random configuration information; determine its illumination state information from the random configuration information; and communicate the determined illumination state information to a selection of lighting devices in the lighting system. In this embodiment, a lighting device appointed as master lighting device is adapted to assume a random illumination state that is an illumination state compliant with the deployed configurable dynamic lighting effect function and to communicate the assumed compliant illumination state to its one or more neighbouring lighting devices such that the remainder of the lighting devices in the lighting system can assume an illumination state synchronised with the assumed compliant illumination state by rippling their individual illumination states through the lighting system as previously explained. This has the advantage that no initial configuration data has to be provided to any of the lighting devices in the lighting system.

Alternatively, the respective controllers of at least some of the lighting devices in the mesh network are adapted to configure the lighting device in response to a controller of at least one of the lighting devices receiving seed configuration information from the system controller or from a user; determine its illumination state information from the seed configuration information; and communicate the determined illumination state information to a selection of lighting devices in the lighting system. In this embodiment, one or more lighting devices in the lighting system are appointed or selected as seed devices at which the generation of the desired dynamic light effect is initiated and propagated throughout the lighting system. By providing these seed devices with local configuration information from which these seed devices generate their illumination state and communicate information identifying their illumination state to downstream (neighbouring) lighting devices in the lighting system, the lighting effect is initiated and expanded. This has the advantage that the dynamic light effect function deployed by the lighting system is configured in a known initial state as defined by the configuration information provided to the seed devices.

The implementation of the mesh network is not particularly limited and may be any suitable mesh network, such as a fully wired mesh network, a fully wireless mesh network or a hybrid mesh network that is part wired and part wireless. In embodiments where at least part of the mesh network is a wireless mesh network, the respective controllers of the lighting devices communicatively coupled by the wireless mesh network may be adapted to determine a relative position of a neighboring lighting device from a signal strength of a signal transmitted by the neighboring lighting device over the wireless mesh network. In this manner, each lighting device can identify its nearest neighbour, which for instance is beneficial in ad hoc networks and/or networks in which the lighting devices do not have a fixed location and as such can receive illumination state information from various neighbouring lighting devices, where each lighting device for instance may only accept illumination state information from its nearest neighbour, thereby increasing the likelihood of an appropriate location-dependent ripple effect through the lighting system.

In embodiments where at least part of the mesh network is a wireless network, at least some of the respective controllers of the lighting devices communicatively coupled by the wireless mesh network are adapted to communicate with neighboring lighting devices via an external bridge device, such as a mobile communications device, which may be a wearable device such as smart glasses or a smart watch, or alternatively may be a mobile phone, tablet device, and so on. In this manner, the range of the wireless network (portion) can be extended, thus facilitating coverage of a larger area by the lighting system.

In embodiments where at least part of the mesh network is a wireless network, the respective controllers of the lighting devices communicatively coupled by the wireless mesh network may be adapted to periodically update the at least one of its neighboring lighting devices for communicating the determined illumination state information to. This is for instance advantageous where the lighting devices are mobile lighting devices without a fixed location within the lighting system, in which case the periodic update of the nearest neighbours of a lighting device ensures that a desired ripple effect deployment, e.g. during synchronisation of the lighting system, is more likely to be maintained.

In some embodiments, the lighting devices may have a fixed position relative to each other. In at least some of such embodiments, the respective controllers of at least some of the lighting devices in the mesh network are adapted to configure the lighting device by extrapolating configuration information for configuring the configurable dynamic lighting effect function to facilitate deployment of its portion of the dynamic lighting effect from illumination state information received from at least one of its neighboring lighting devices and its position relative to said at least one neighboring lighting device and/or to the system controller. In this manner, the deployment of a dynamic lighting effect that changes position, i.e. migrates across lighting devices of the lighting system, over time can be accurately configured.

In an embodiment, each lighting device is a tile-shaped lighting device having a major surface comprising a plurality of pixels, wherein the determined illumination state information comprises illumination characteristics of a set of pixels along an edge of the major surface adjacent to an edge of the major surface of a neighboring tile-shaped lighting device targeted to receive the determined illumination state information. In this manner, a boundary condition of a particular tile can be communicated to its neighbouring tile, such that the controller of the neighbouring tile can configure the illumination state in accordance with that the configurable dynamic light effect function such that a seamless transition of the dynamic light effect is achieved between tiles.

The determined illumination state information may further comprise tracking information of a displayed object moving across the major surface of the tile-shaped lighting device such that the respective controllers of neighbouring tiles can seamlessly transfer the moving object across tile boundaries during implementation of the dynamic light effect function.

In an embodiment, the respective controllers are further adapted to ignore illumination state information received from at least one of its neighboring lighting devices in case of previously received illumination state information associated with the configurable dynamic lighting effect function. For example, when a controller has assumed a configured state of the configurable dynamic lighting effect function, further configuration information in the form of illumination state information from one or more neighbouring lighting devices no longer needs considering and may therefore be ignored.

It is not necessary for all the lighting devices to communicate their illumination state information across the mesh network. For example, at least some of the lighting devices may further comprise an optical sensor coupled to its controller for determining illumination state information for a neighboring lighting device from the luminous output of the neighboring lighting device. In this embodiment, the communication of the illumination state information to a downstream lighting device may occur of the mesh network or alternatively may simply be the adoption of its illumination state by the lighting device, in which case the downstream lighting device may obtain the illumination state information by capturing the illumination state of its upstream neighbour using its optical sensor.

In an embodiment, the mesh network is partitioned into a plurality of mesh network domains, and wherein the system controller is communicatively coupled to a respective lighting device in each of the mesh network domains. This for instance facilitates highly flexible lighting systems to which network domains (i.e. clusters of interconnected lighting devices) can be added or from which network domains can be removed and further facilitates more rapid synchronisation (configuration) of the configurable dynamic light effect function across the mesh network as such synchronisation can take place simultaneously in the respective mesh network domains.

The respective controllers of at least some of the lighting devices in the mesh network may be further adapted to predict future illumination state information for a neighboring lighting device from its determined illumination state information; and communicate the predicted future illumination state information to the neighboring lighting device. Because the time-dependent characteristics of dynamic light effect functions can be predicted from the function specification, each controller can predict a future illumination state of its neighbours, in particular where the spatial relationship between neighboring lighting devices is known. This is particularly beneficial when local light effects, e.g. moving objects, are handed over between neighboring lighting devices, as the predicted future illumination state information allows the neighboring lighting device to prepare for such a handover, i.e. calculate its configuration information in advance, which facilitates a smooth handover of the light effect between neighboring lighting devices.

Preferably, each lighting device comprises a plurality of LED light sources as such light sources have short response times and can be configured to adopt a large number of different illumination states, e.g. different colours, making such light sources particularly suitable for the deployment of dynamic lighting effects.

According to another aspect, there is provided a lighting device for use in a lighting system according to any of the above embodiments, the lighting device being adapted to deploy a portion of a dynamic lighting effect to be deployed by the lighting system, the lighting device comprising a controller; and a network communication module adapted to interconnect with other lighting devices to form a mesh network such that the lighting device is communicatively coupled to at least one neighboring lighting device and adapted to communicate illumination state information to the at least one neighboring lighting device; wherein the controller is adapted to configure the lighting device by extrapolating configuration information for configuring a configurable dynamic lighting effect function defining the dynamic lighting effect to be deployed by the lighting system received from the system controller of the lighting system to facilitate deployment of its portion of the dynamic lighting effect from illumination state information received from at least one of its neighboring lighting devices; and determining its illumination state information from the extrapolated configuration information; and being further adapted to communicate the determined illumination state information to at least one of its neighboring lighting devices. Such a lighting device facilitates the configuration or reconfiguration, e.g. expansion, of a lighting system according to embodiments of the present invention.

According to yet another aspect, there is provided a method of configuring a lighting system for deploying dynamic lighting effects, the lighting system comprising a plurality of lighting devices, each lighting device being adapted to deploy a portion of a dynamic lighting effect and comprising a controller and a network communication module, the respective lighting devices being interconnected in a mesh network through their respective network communication modules such that each lighting device is communicatively coupled to at least one neighboring lighting device and adapted to communicate illumination state information to the at least one neighboring lighting device; and a system controller communicatively coupled to the mesh network and adapted to broadcast a configurable dynamic lighting effect function to the lighting devices in the mesh network, said dynamic lighting effect function defining the dynamic lighting effect to be deployed by the lighting system; the method comprising, configuring at least some of the lighting device is in the mesh network with their respective controllers, by performing the steps of extrapolating configuration information for configuring the configurable dynamic lighting effect function to facilitate deployment of its portion of the dynamic lighting effect from illumination state information received from at least one of its neighboring lighting devices; determining its illumination state information from the extrapolated configuration information; and communicating the determined illumination state information to at least one of its neighboring lighting devices. Such a method facilitates the configuration of a dynamic light effect function across the lighting system without the system controller having to provide configuration information to each of the respective lighting devices in the lighting system, as previously explained.

BRIEF DESCRIPTION OF THE DRAWINGS

Embodiments of the invention are described in more detail and by way of non-limiting examples with reference to the accompanying drawings, wherein.

DETAILED DESCRIPTION OF THE EMBODIMENTS

Figure 1:
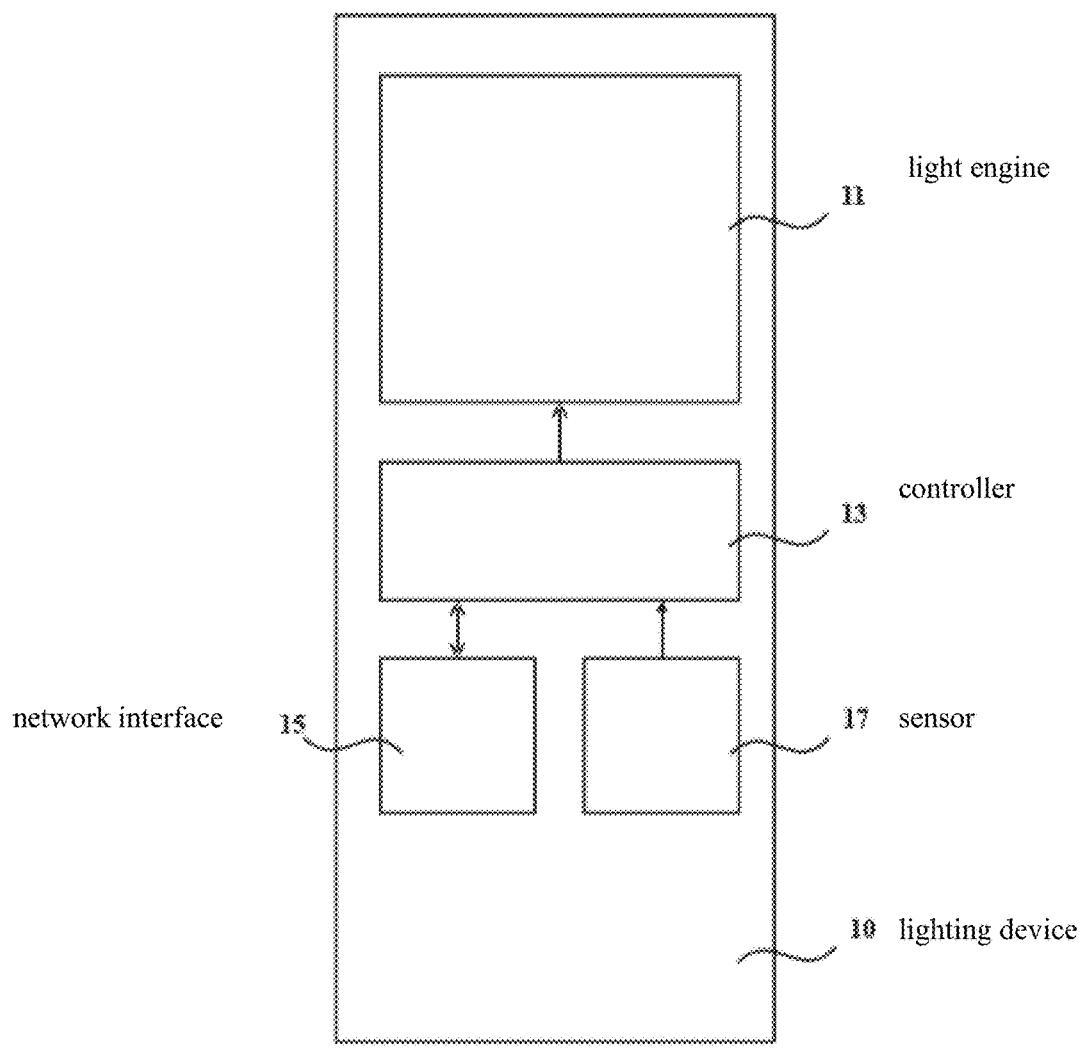
FIG. 1 schematically depicts an example embodiment of the lighting device for use in a lighting system according to embodiments of the present invention.

It should be understood that the Figures are merely schematic and are not drawn to scale. It should also be understood that the same reference numerals are used throughout the Figures to indicate the same or similar parts.

FIG. 1 schematically depicts a lighting device 10 for use in a lighting system according to embodiments of the present invention. The lighting device 10 typically comprises one or more light engines 11, which preferably are one or more LEDs. The one or more light engines 11 may be capable of adjusting their luminous output, for example by adjusting at least one of light intensity, light colour, colour temperature, and so on. In case the lighting device 10 comprises a plurality of light engines 11, the light engines 11 may be arranged in an array or grid. For example, the lighting device 10 may take the shape of a rectangular tile having a major surface in which the grid of light engines 11 is arranged, e.g. below a transparent cover plate or any other suitable arrangement, in which the light engines 11 are configured as pixels of a display area represented by the major surface of the lighting device 10. The one or more light engines 11 preferably are LEDs capable of producing a range of colours. This may be achieved in any suitable manner, for example by the provision of LED packages in which multiple LEDs are combined. Such LEDs are well-known per se and are therefore not described in further detail for the sake of brevity only.

The lighting device 10 further comprises a controller 13 for controlling the one or more light engines 11. In case of the lighting device 10 comprising a plurality of light engines 11, the controller 13 may be arranged to individually control each light engine 11, for example where each light engine 11 represents a pixel of the lighting device 10, or may be arranged to control clusters or groups of light engines 11, with the plurality of light engines 11 comprising at least one of such clusters or groups. The controller 13 may be implemented in any suitable manner, for example as a microprocessor or the like. In at least some embodiments, the controller 13 further comprises a clock or timer, which for instance may be advantageous where the lighting device 10 is configured to implement a portion of a dynamic light effect, as per definition this requires the lighting device 10 to periodically or continuously alter its luminous output, which may require the controller 13 to be able to keep track of the amount of time elapsed since the most recent configuration change of the one or more light engines 11, which may be achieved with the clock or timer.

The controller 13 may further comprise or have access to a data storage device in which configurable dynamic light effect functions may be stored. In this manner, the controller 13 for instance may store a configurable dynamic light effect function received from a system controller of a lighting system including its lighting device 10 in the data storage device or alternatively a plurality of such configurable dynamic light effect functions may be pre-stored in the data storage device, in which case the system controller of such a lighting system only needs to communicate an identifier of one of the pre-stored configurable dynamic light effect functions to the controller 13 such that the controller 13 can retrieve the appropriate pre-stored configurable dynamic light effect function from its data storage device. Any suitable data storage device, e.g. any suitable type of memory device, a solid state disk, a magnetic disk, an optical disk, and so on, may be used for this purpose.

The lighting device 10 further comprises a network interface 15 for forming a mesh network with other lighting devices 10 in the lighting system according to embodiments of the present invention. The network interface 15 is communicatively coupled to the controller 13 such that network communications can be received by the controller 13 and used to configure the one or more light engines 11 as will be explained in more detail below. In an embodiment, the network interface 15 comprises a network interface module including a input port for receiving a network cable in case of the lighting device 10 forming part of a wired mesh network. In another embodiment, the network interface 15 comprises a transmitter and receiver in case of the lighting device 10 forming part of a wireless mesh network. In yet another embodiment, the network interface 15 may comprise both the network interface module for wired network connections and the wireless network interface in the form of the transmitter and receiver for wireless network connections. The network interface 15 may be configured to operate in accordance with any suitable network protocol, such as for example DMX, e.g. DMX 512, or DALI protocols for wired networking and near-field communication protocols, Zigbee, Bluetooth, Wi-Fi and so on for wireless networking. The Zigbee protocol is particularly preferred as this allows for (ad-hoc) mesh network formation.

Optionally, the lighting device 10 may further comprise an optical sensor 17 for detecting an illumination state of a lighting device in the vicinity of the lighting device 10, e.g. a neighbouring lighting device. Such an optical sensor 17 may be any suitable optical sensor for detecting an illumination state, e.g. a photo sensor or the like. Although not explicitly shown, the lighting device 10 may further comprise a user interface for allowing a user to provide the lighting device 10 with control instructions. Such a user interface may take any suitable shape, e.g. one or more dials and/or buttons, one or more touch sensors, and so on. In an embodiment, the user interface may comprise a touch sensitive screen, which for example may be the major surface of a tile-shaped lighting device 10.

It should be understood that the lighting device 10 typically comprises further elements that are not relevant to the implementation of the present invention such as driver circuitry for the one or more light engines 11, one or more power supply connections and/or integrated power supplies, e.g. batteries, and so on. The skilled person will immediately realise that the lighting device 10 may comprise any of such further elements, which therefore should be considered to form part of the lighting device 10 where appropriate.

In accordance with embodiments of the present invention, a lighting system is provided comprising a plurality of lighting devices 10 in which the lighting devices 10 are communicatively connected via their respective network interfaces 15 to form a mesh network. The lighting devices 10 will also be referred to as nodes or network nodes of such a mesh network. As is well-known per se, a mesh network is a network topology in which each node relays data for the network. All nodes may cooperate in the distribution of data across the mesh network. A system controller is also present, and may be communicatively coupled to the mesh network in any suitable manner, for example by communicative coupling to one or more of the lighting devices 10 acting as network nodes. The actual network implementation is not particularly limited and any suitable network implementation may be employed. For example the mesh network may be a wired network, a hybrid network comprising a wired portion and a wireless portion or a wireless mesh network in which the various lighting devices 10 act as radio nodes of the wireless network. The mesh network may comprise a single mesh domain, in which case the system controller may be adapted to communicate with a single node of the mesh network, which communication is subsequently rippled through the mesh network by the node to node communication associated with mesh networks or may comprise multiple domains in which case the system controller may be adapted to communicate with a single node in each domain.

Figure 2:
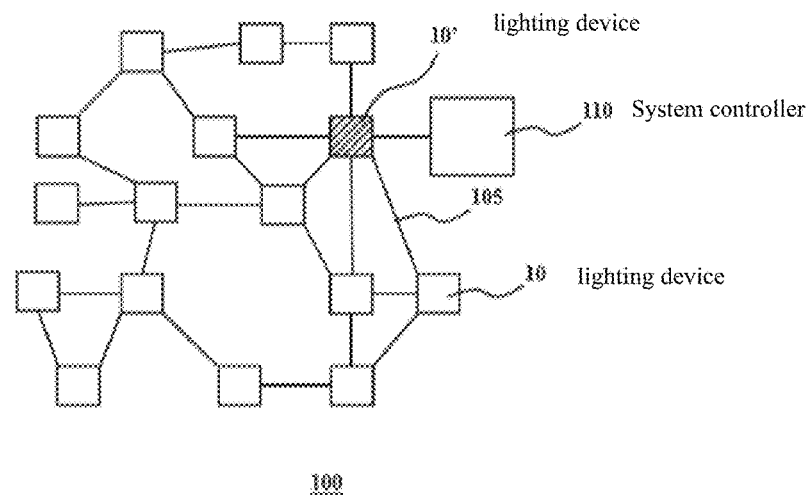
FIG. 2 schematically depicts an example embodiment of a lighting system according to the present invention.

FIG. 2 schematically depicts an example embodiment of a lighting system 100 implemented as a single domain wired mesh network in which lighting devices 10 form the nodes of the mesh network, with interconnections between adjacent nodes being symbolized by solid lines 105. The system controller 110 is communicatively coupled to lighting device 10', which may act as a master device or seed device for the lighting devices 10 in the mesh network as will be explained in more detail below. Each node in the lighting system 100 may have a fixed location (as is typically the case in wired networks), and the respective controllers 13 of the lighting devices 10 in the mesh network may have awareness of this location for reasons that will be explained in more detail below.

Figure 3:
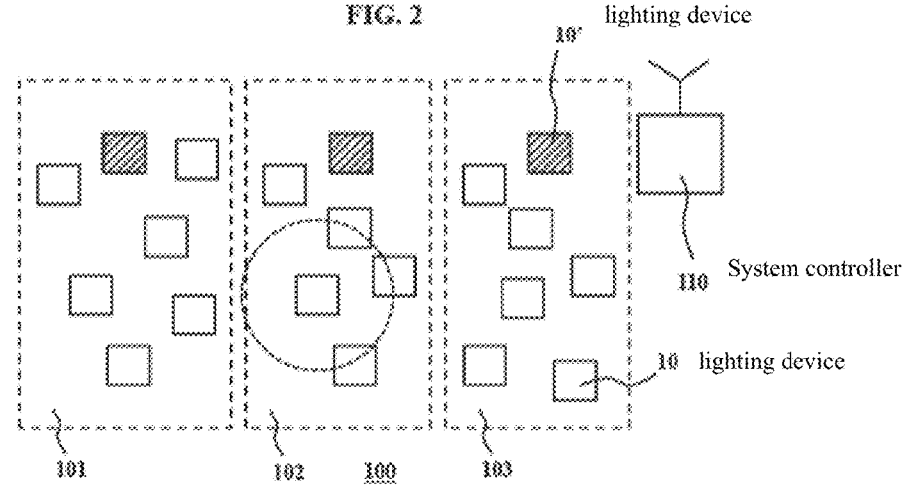
FIG. 3 schematically depicts another example embodiment of a lighting system according to the present invention.

FIG. 3 schematically depicts an example embodiment of a lighting system 100 implemented as a multi-domain wireless mesh network, here shown to contain three domains 101, 102, 103 by way of non-limiting example as any suitable number of domains may be present. Each domain typically comprises a plurality of lighting devices 10 and may include a master or seed lighting device 10' communicatively coupled to the controller 110 via a wireless link or communication channel. Each lighting device 10 may be adapted to limit the number of communication partners in the wireless mesh network, and may be adapted to limit this number to a predefined number, e.g. four communication partners by way of non-limiting example. The lighting devices 10 may select their nearest neighbours as communication partners, and may make this selection in any suitable manner. For example, each lighting device 10 may select its communication partners based on the signal strength of the respective wireless communication signals received from lighting devices 10 in its vicinity as indicated by the dashed circle in FIG. 3. The lighting devices 10 having the strongest signals may be selected as the communication partners of such a lighting device 10. Such selection may be implemented using the controller 13 of the lighting device receiving wireless communication signals through the network interface 15 of the lighting device 10.

Figure 4:
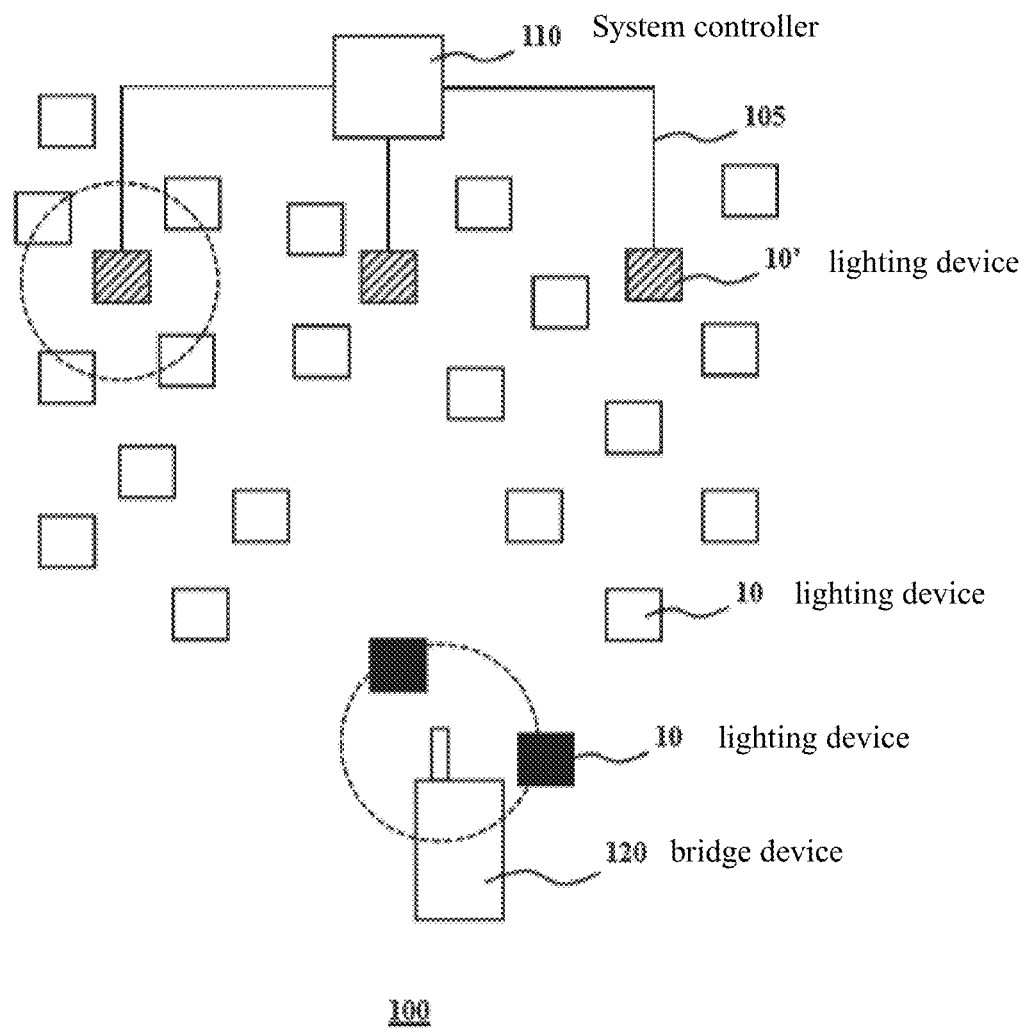
FIG. 4 schematically depicts another example embodiment of a lighting system according to the present invention.

FIG. 4 schematically depicts an example embodiment of a lighting system 100 having a hybrid mesh network in which some lighting devices 10' are wired to the system controller 110 and may act as seed devices for propagating data from the system controller 110 through the mesh network. The lighting devices 10' may be wired to further lighting devices 10 in the mesh network or may be wirelessly connected to such further lighting devices 10 as explained above, e.g. to a selection of lighting devices 10 within communication range as indicated by the dashed circle around one of the seed lighting devices 10'.

In addition, the lighting system 100 may further utilise one or more bridge devices 120 that relay communication from one wireless node to another wireless node, here exemplified by black lighting devices 10 within communication range of a bridge device 120 as indicated by the dashed circle around the symbolic aerial of the bridge device 120, for example in a scenario where pairing between wireless nodes is desirable but cannot be realised without such a bridge device due to the distance between these nodes. Such a bridge device 120 for example may be a user-controlled device capable of wireless communication, such as a portable or wearable wireless communication device, e.g. a smart watch, a smart phone, a tablet device, and so on. It should be understood for the avoidance of doubt that the use of such a bridge devices within the lighting system 100 is not limited to such hybrid mesh networks or may be employed in any mesh network comprising a wireless portion or being entirely wireless. In some embodiments, the bridge device 120 may operate as an auxiliary node of the lighting system 100 that is capable of capturing and relaying illumination state information between lighting devices 10 in the lighting system 100. In some embodiments, the bridge device 120 may operate as the system controller 110 or may be communicatively coupled to the system controller 110 to facilitate user control of the system controller 110.

Additionally or alternatively, such a device 120 may be used as a user interface to inject a particular configuration, e.g. a user-define configuration, into one of the nodes of the mesh network for rippling through the mesh network as will be explained in more detail below.

Figure 5:
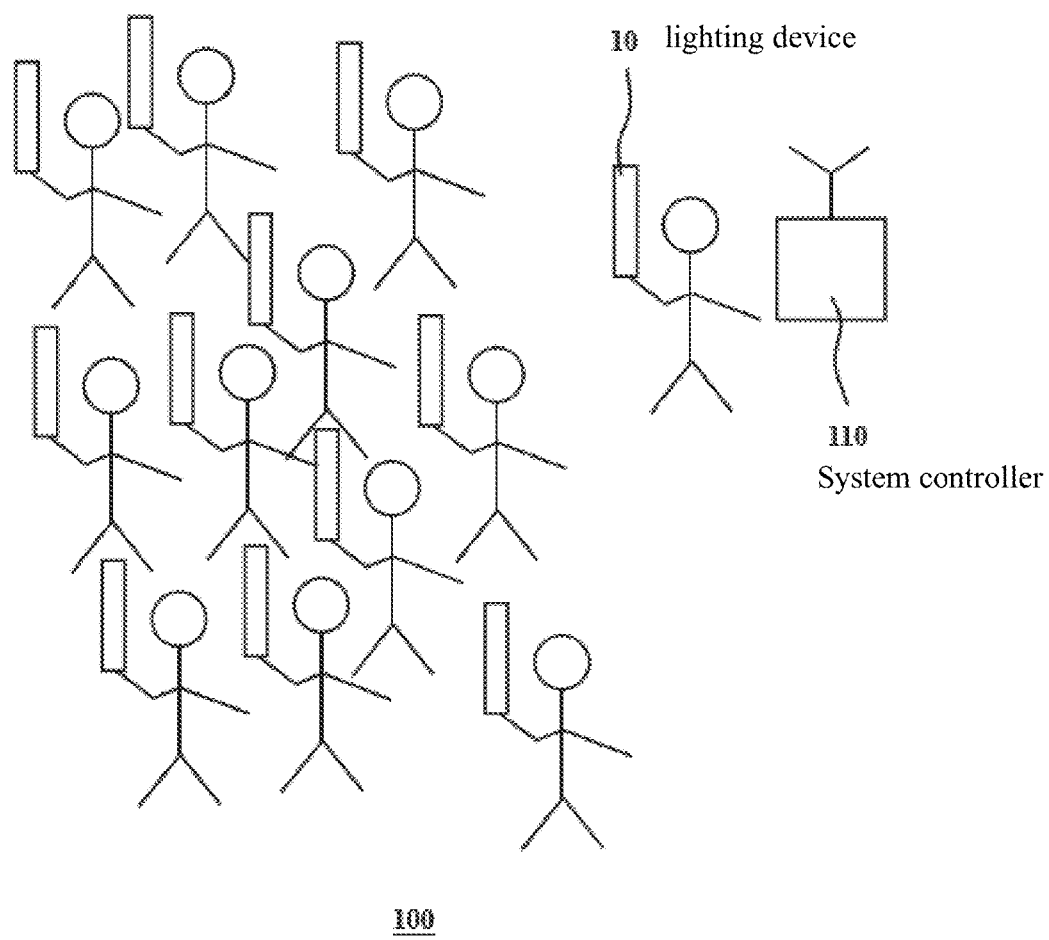
FIG. 5 schematically depicts another example embodiment of a lighting system according to the present invention.

FIG. 5 schematically depicts an example embodiment of a mobile lighting system 100 in which the lighting devices 10 are in wireless connection with each other to form the mesh network and have no fixed location, for example in case of portable lighting devices 10 carried by a number of people who move around through a space in which the lighting system 100 is deployed, for example for deploying a lighting system 100 according to an embodiment of the present invention during events. The system controller 110 may select one or more of the lighting devices 10 in communication range with the system controller 10 as seed devices for communicating configuration information across the mesh network, e.g. by selecting the one or more lighting devices 10 based on signal strength as previously explained.

In such an embodiment, or indeed any embodiment in which the lighting devices 10 do not have a fixed location within the lighting system 100, the controllers 13 of the respective lighting devices 10 are typically adapted to periodically update the lighting devices 10 to which they are wirelessly connected, e.g. select their nearest neighbours in the wireless mesh network, for example by periodically evaluating the signal strength of the wireless signals received from lighting devices 10 within wireless communication range and selecting the lighting devices 10 producing the strongest wireless signals as communication partners in the wireless mesh network as previously explained.

It is reiterated that these are non-limiting example embodiments of such mesh networks and that many alternative embodiments of such mesh networks, e.g. wired, wireless or hybrid mesh networks in which the lighting devices 10 may have fixed positions or in which at least some of the lighting devices 10 may have variable positions can be contemplated without departing from the teachings of the present invention.

The lighting system 100 according to embodiments of the present invention is capable of deploying dynamic lighting effects across the various nodes, i.e. lighting devices 10, of the mesh network. In the context of the present application, a dynamic lighting effect is a continuous or otherwise global lighting effect across the lighting devices 10 of the lighting system 100 in which each lighting device 10 requires a local configuration in order to generate a portion of the dynamic lighting effect. Typically but not necessarily, such a dynamic lighting effect requires different lighting devices 10 within the lighting system 100 to adopt different local configurations, e.g. different illumination states, in order to achieve the overall lighting effect. Additionally or alternatively, a dynamic lighting effect is a lighting effect that changes over time, typically by having the various lighting devices 10 of the lighting system changing their illumination states in a synchronised manner. This may be a continuous change or a periodic change, i.e. a change in an illumination state at set intervals, which changes may be triggered by the respective controllers 13 of the lighting devices 10. Non-limiting examples of such dynamic lighting effects include rainbow effects, colour wave effects, swarm effects, colour chase effects, or more complex effects in which a moving object is displayed across the lighting system 100, or any combination of such effects.

Figure 6:
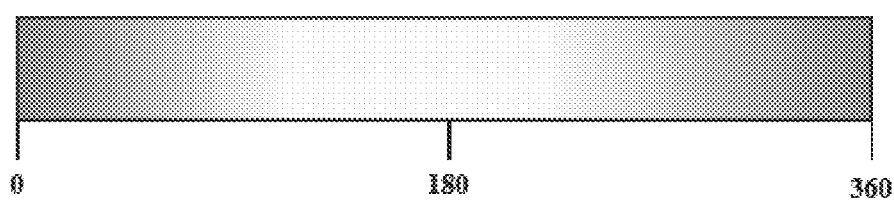
FIG. 6 schematically depicts an aspect of an example dynamic light effect.

As will be readily understood, the deployment of such dynamic lighting effects across the lighting system 100 requires the synchronisation of the respective lighting devices 10 in the sense that each lighting device 10 should have a local state corresponding to the dynamic lighting effect deployed by the lighting system 100. For example, FIG. 6 schematically depicts a typical colour loop to be used in a colour chase effect in which each node of the mesh network periodically or continuously changes colour based on the colour loop. During implementation of the colour chase effect, each node cycles through the colour loop at a fixed rate such that each node changes colour in a synchronised manner, thereby implementing a colour wave effect. In order to achieve the colour wave effect, each node must be initialised to have a certain initial colour, i.e. assume an initial position (offset) on the colour loop, in order to create the colour wave effect across the lighting system 100. This initial colour may be a function of the position of the lighting device 10 in the lighting system 100, which may be a known fixed position or may be a position relative to its nearest neighbour, which for instance may be extrapolated from the signal strength of a signal received from his nearest neighbour in case of lighting systems 100 in which at least some of the lighting devices 10 do not have a fixed position. This for instance is the case in colour wave effects where the lighting system 100 is configured to display a wave through a range of colours simultaneously displayed on the lighting system 100. Alternatively, such a colour wave effect may have all the lighting devices 10 to initially display the same colour change this colour in a synchronised manner according to the colour loop.

Figure 7:
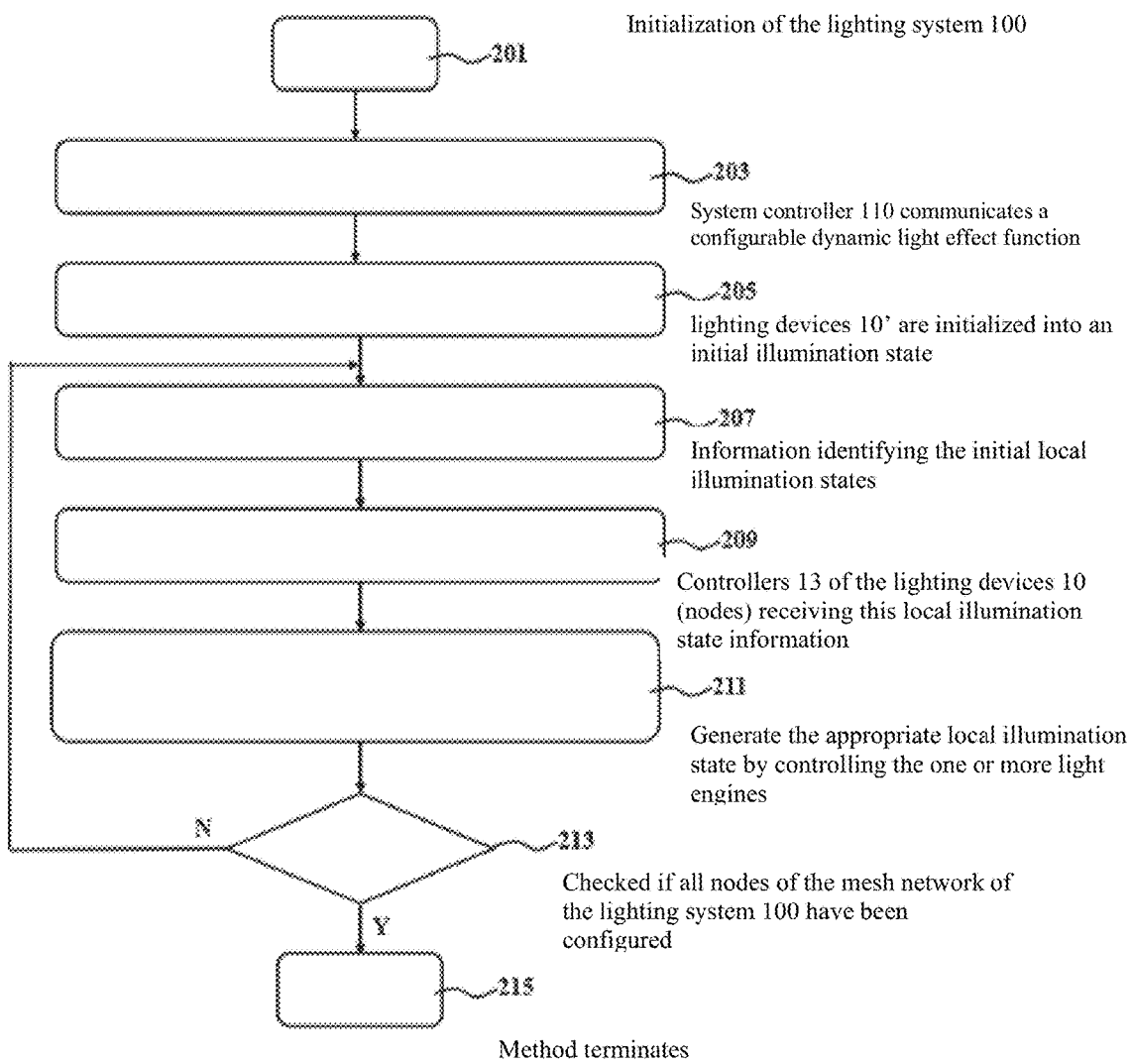
FIG. 7 is a flowchart of an example embodiment of a method for configuring embodiments of a lighting system according to present invention.

The principles of at least some embodiments of the present invention will now be explained with the aid of the aforementioned colour loop function although it should be understood that this colour loop function is chosen by way of non-limiting example and that these principles are equally applicable to other dynamic light effect functions. FIG. 7 is a flowchart of an example embodiment of a configuration method of the lighting system 100, which method reduces the required bandwidth between the system controller 110 and the various lighting devices 10 in the mesh network of the lighting system 100.

The method 200 depicted in FIG. 7 starts in 201 with the initialisation of the lighting system 100, which may include at least one of: switching on the respective lighting devices 10 and/or the system controller 110, providing the system controller 110 with dynamic light effect function selection information, which for example may be provided by a user using a user interface of the lighting system 100, e.g. a user interface forming part of the system controller 110 or a separate user interface such as a remote control or a bridge device 120 in wireless communication with the system controller 110 or acting as the system controller 110, and configuring the mesh network in case of at least part of the mesh network being a wireless network in which at least some of the lighting devices then may not have a fixed or known location.

The method 200 subsequently proceeds to 203 in which the system controller 110 communicates a configurable dynamic light effect function to be implemented by the lighting system 100 to the one or more nodes of the mesh network to which the system controller 110 is connected, which nodes communicate this configurable dynamic light effect function to selected other nodes in the lighting system 100, e.g. one or more neighbouring nodes, which process is repeated until the configurable dynamic light effect function is communicated across all the nodes, i.e. lighting devices 10, in the lighting system 100. The dynamic light effect function is configurable in the sense that the function specifies the dynamic light effect to be achieved across the lighting system 100 but does not specify the local configuration or illumination state to be adopted by each of the lighting devices 10 in the lighting system 100 to achieve this dynamic lighting effect in a synchronised manner.

For example, in the case of a colour wave effect, the respective lighting devices are typically aware of the overall effect the need to be established across the lighting system 100 as this information is contained in the dynamic light effect function communicated by the system controller 100 across the mesh network, but it does not provide the respective lighting devices 10 with the necessary information to assume the appropriate position on the colour loop despite potentially having knowledge of its location relative to the edge of the lighting system 100, because the local illumination state at the edge is unknown.

As will be appreciated, because this local configuration information is not included in the communication from the system controller 110, this communication requires substantially less bandwidth compared to communications in which the local configuration information for each node of the mesh network is included, but it obviously requires a separate mechanism to generate and deploy such local configuration information across the mesh network.

To this end, the method 200 proceeds to 205 in which one or more selected lighting devices 10' are initialised into an initial illumination state that is compliant with the deployed configurable dynamic light effect function. The one or more selected lighting devices 10' may be considered master devices or seed devices of the mesh network as their local illumination states will be used as configuration information by selected lighting devices 10 in the mesh network as will be explained in more detail below.

Where it is desirable that the one or more selected lighting devices 10', i.e. the one or more seed devices, are initialised into a particular illumination state, e.g. an illumination state in which a particular colour, colour effect such as a rainbow effect or gradient effect, an object display effect, and so on, is generated, the one or more selected lighting devices 10' may be provided with specific local configuration information triggering the respective controllers 13 of the one or more selected lighting devices 10' to implement the configurable dynamic lighting effect function using the received specific local configuration information in order to bring the one or more light engines 11 into the desired illumination state. Such specific local configurations information may be provided by the system controller 110 or by a separate user-controlled control device, e.g. a bridge device 120.

Alternatively, it may be acceptable that the one or more selected lighting devices 10' are configured in any initial illumination state that is compliant with the deployed configurable dynamic light effect function. In such a scenario, the respective controllers 13 of the one or more selected lighting devices 10' may employ a random generator for generating random configuration information (data) for configuring the configurable dynamic lighting effect function received in 203. In such a scenario, it is preferred that only a single lighting device 10' is selected in order to avoid potential conflicts, e.g. discontinuities, in the lighting effect created across the mesh network due to different seed nodes initialising into different initial illumination states.

Next, the method 200 proceeds to 207 in which information identifying the initial local illumination states generated by the one or more selected lighting devices 10' in 205 is communicated to one or more selected lighting devices 10 in the mesh network, e.g. one or more lighting devices 10 that are neighbours to the one or more selected lighting devices 10'. In the context of the present application, such communication may comprise communication of the local illumination state information across the mesh network although in some embodiments at least some of these communications may be the generation of the local illumination state by a 'transmitting' lighting device 10 and the capture of the local illumination state with an optical sensor 17 of a 'receiving' or downstream lighting device 10. In some embodiments, this communication may include a combination of such network communication and optical capturing.

In 209, the controllers 13 of the lighting devices 10 (nodes) receiving this local illumination state information of an upstream, e.g. neighbouring, lighting device 10' extract local configuration information for the configurable dynamic light effect function to be employed by the one or more light engines 11 of the receiving lighting device 10 from the received local illumination state information. For example, a particular light effect may be characterised by boundary conditions between adjacent lighting devices 10, such that the extraction of a boundary condition from the illumination state information received from an adjacent lighting device 10 dictates to the controller 13 of the lighting device 10 to be configured what boundary conditions should be assumed by its one or more light engines 11. As such boundary conditions typically corresponds to a particular configuration of the configurable dynamic light effect function, the controller 13 can derive the appropriate configuration information for its one or more light engines 11 from the received local illumination state information of its adjacent lighting device 10.

Obviously, such local illumination state information may be any suitable type of illumination state information, such as an illumination colour from which the receiving lighting device 10 can derive the illumination colour to be employed by its one or more light engines 11, e.g. the same illumination colour or a different illumination colour, which for instance may be an illumination colour selected from a colour loop such as the colour loop in FIG. 6 based on the colour information received from the adjacent lighting device and a distance between the receiving lighting device 10 and its adjacent lighting device.

More generally, at least some embodiments of the method 200 are based on the realisation that a dynamic light effect is typically defined by global transition characteristics between local domains of the lighting system 100, i.e. between adjacent or neighbouring lighting devices 10, such that by communication of these transition characteristics to the respective controllers 13 of the lighting devices 10 in the lighting system 100 or by pre-programming such transition characteristics into the respective controllers 13, such controllers can derive the local configuration information for their one or more light engines 11 from the illumination state information received from an adjacent or neighbouring lighting device 10 from a lighting device 10 having a particular spatial relationship with the lighting device 10 receiving the illumination state information, e.g. a pair of lighting devices at particular grid positions in a lighting system 100 comprising a grid of lighting devices 10.

The recipient lighting devices 10 of the local illumination state information communicated in 207 subsequently derive the configuration information of the configurable dynamic light effect function as explained above in 209 and generate the appropriate local illumination state by controlling the one or more light engines accordingly in 211. Next, it is checked in 213 if all nodes of the mesh network of the lighting system 100 have been configured in this manner. If this is not the case, the method 200 reverts back to 207 in which the most recently configured lighting devices 10 communicate their local illumination state information to the next selection of unconfigured lighting devices 10, e.g. one or more neighbouring lighting devices 10 in the mesh network, for these recipient lighting devices to extract their local configuration information from the received local illumination state information in 209 and generate their appropriate illumination state with the one or more light engines 11 by configuring the configurable dynamic lighting effect function with the generated configuration information. This process is repeated until it is determined in 213 that all nodes of the mesh network have been configured, at which point the method 200 terminates in 215.

At this point it is noted that a lighting device 10 may be a nearest neighbour to more than one upstream lighting devices 10, in which case such a downstream lighting device 10 may receive local illumination state information multiple times. This for instance may be the case in a wireless mesh network in which the positions of the lighting devices 10 can change, such that the nearest neighbour relations between lighting devices 10 in the wireless mesh network can change. In such a scenario, the recipient lighting device 10 may ignore subsequently received local illumination state information if the recipient lighting device 10 has already configured the configurable dynamic light effect function with configuration information extracted from previously received local illumination state information, i.e. is already in a steady state. It is noted that this is not limited to wireless mesh networks only but may also apply to wired mesh networks in which lighting devices 10 have multiple neighbours at different depths of the mesh network. In this context, the term depth is intended to indicate the iteration number at which a particular lighting device communicates its local illumination state information downstream. A recipient lighting device 10 may for example receive local illumination state information in a second iteration of the loop involving steps 207, 209, 211 and 213 of the method 200 and may subsequently receive local illumination state information in a later iteration of this loop, which later received local illumination state information may be ignored.

In an embodiment, the mesh network may be configured to have a predefined information deployment schedule in which each downstream node receives information from a single upstream node only in order to avoid such duplication of local state information being deployed to the nodes in the mesh network.

Figure 8:
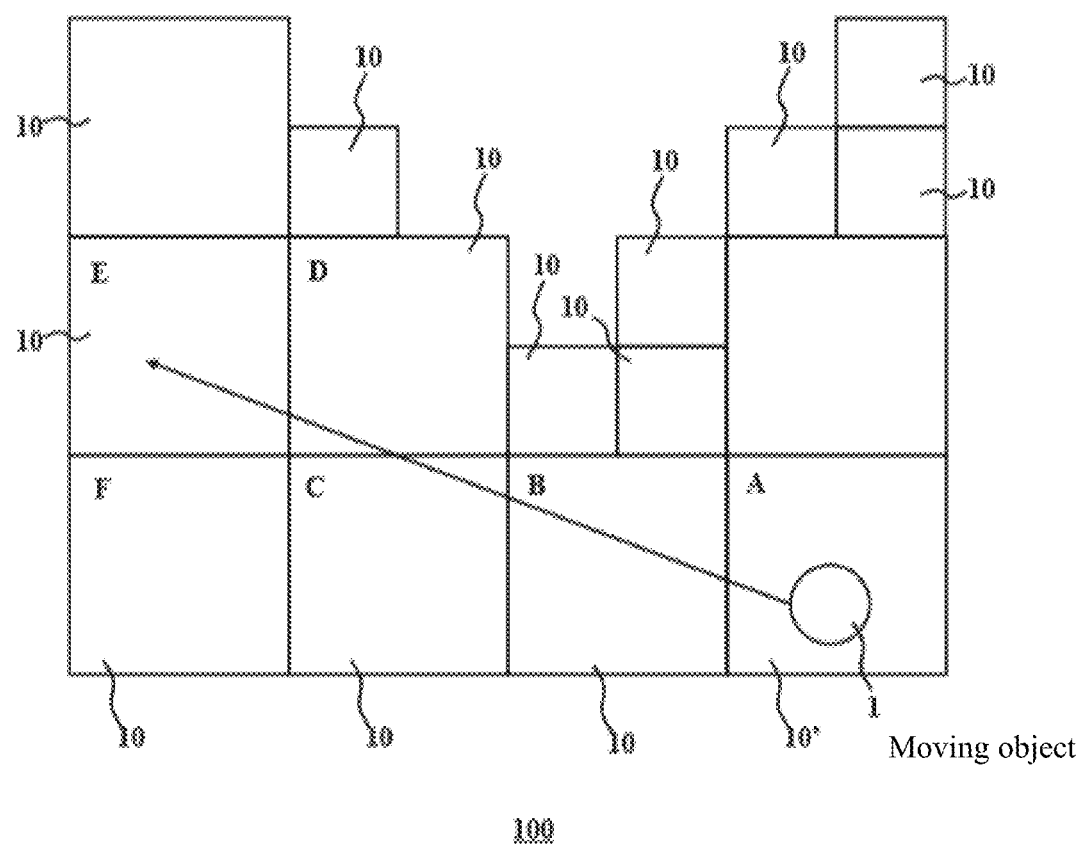
FIG. 8 schematically depicts another example embodiment of a lighting system according to the present invention.

FIG. 8 schematically depicts an embodiment of the lighting system 100 comprising a plurality of tile-shaped lighting device 10, wherein each lighting device 10 comprises a major surface comprising a grid of light engines 11 defining individual pixels of the major surface. The major surface may be a display surface. In this embodiment, the respective lighting devices 10 form an irregular grid of tiles the way of non-limiting example; it is equally feasible that the respective lighting devices 10 form a regular grid of tiles. Such a lighting system 100 for instance may be used for the deployment of complex dynamic lighting effects, such as for example a rainbow effect or another gradient colour effect across the grid in combination with a body 1 moving across respective tiles of the grid, in the present example tiles A-F.

In accordance with embodiments of the present invention, the rainbow effect may be implemented by broadcasting the configurable rainbow effect function across the mesh network formed by the respective tiles, i.e. tile-shaped lighting devices 10, and by sending configuration information to an initial tile 10', i.e. a seed tile, or by invoking a random initialisation of this tile as previously explained. The controller 13 of the initial tile 10' configures the respective light engines 11 i.e. the pixels of its grid, accordingly and the corresponding local illumination state information is rippled through the lighting system 100 in order to allow the remaining lighting devices 10 (tiles) to derive their local configuration information from the received local illumination state information as previously explained. In an embodiment, the local illumination state information comprises boundary information regarding the illumination state of the pixels at an edge of the upstream tile 10 or 10' that is adjacent to the edge of the recipient tile 10 such that the controller 13 of the recipient tile 10 can extract the appropriate configuration information from this boundary information, e.g. by choosing a configuration in which its pixels along the edge adjacent to the neighbouring edge for which the illumination state information has been received are brought into an illumination state matching the received illumination state information in order to create a seamless transition or a desired transition gradient between the two tiles.

In this embodiment, the lighting system 100 is further configured to exchange local illumination state information during implementation of the dynamic lighting effect, such as information pertaining to the movement of the moving object 1 (here a moving ball the way of non-limiting example). In this example, the moving object 1 is first rendered at node or tile A, which may have received or generated configuration parameters associated with the object size, object shape, object colour, object movement direction and object movement speed and which node A may communicate these parameters to appropriate downstream nodes, e.g. node B and relevant further nodes, e.g. nodes C-F. These parameters facilitate the local rendering of the object and its trajectory at each of these tiles, such that these tiles can calculate when to take over rendering of the object 1 from the tile from which the object 1 is exiting, thereby generating a seamless motion of the object 1 across the lighting system 100. Alternatively, a tile from which the object 1 is exiting may provide the destination tile with exiting parameters such as exiting time and exiting position such that the destination tile can start rendering the object 1 in the correct location at the correct point in time to ensure seamless transition of the object 1 between tiles in the lighting system 100.

In an embodiment, the controller 13 of a tile 10, e.g. the tile presently rendering the moving object is further adapted to provide the relevant neighboring tile with predictive illumination state information for the neighboring tile that allows the neighboring tile to prepare for taking over rendering of the moving object 1. For example, the controller 13 of a tile 10 presently rendering the moving object may predict for the neighboring tile the illumination state at point of handover of the moving object 1 between the neighboring tiles to ensure a smooth handover of the object 1 between tiles. The controller 13 may pass this predictive light state information onto the neighboring tile such that the neighboring tile can seamlessly take over rendering of the moving object 1 based on the predicted light state information, e.g. by generating its configuration information in advance from its light state information predicted by its neighbour. It is noted that such predictive light state information generation for neighboring lighting devices 10 is not limited to tile-based lighting devices but may be employed in any of the aforementioned embodiments of the present invention where a dynamic lighting effect is passed on between neighboring lighting devices.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:
1. A lighting system for deploying dynamic lighting effects, the lighting system comprising:

a plurality of lighting devices, each lighting device being adapted to deploy a portion of a dynamic lighting effect and comprising a controller and a network communication module, the plurality of lighting devices being interconnected in a mesh network through their respective network communication modules such that each lighting device is communicatively coupled to at least one neighboring lighting device and adapted to communicate illumination state information to the at least one neighboring lighting device; and a system controller communicatively coupled to the mesh network and adapted to broadcast a configurable dynamic lighting effect function to the plurality of lighting devices in the mesh network, said configurable dynamic lighting effect function defining the dynamic lighting effect to be deployed by the lighting system;

wherein at least some of the plurality of lighting devices' respective controllers in the mesh network are adapted to configure the lighting device by:

configuring the configurable dynamic lighting effect function based on illumination state information received from at least one of the at least some of the plurality of lighting devices' neighboring lighting devices to facilitate deployment of its portion of the dynamic lighting effect;

determining the at least some of the plurality of lighting devices' illumination state information from the configured configurable dynamic lighting effect function; and communicating the determined illumination state information to at least one of the at least some of the plurality of lighting devices' neighboring lighting devices.

2. The lighting system of claim 1, wherein the at least some of the lighting devices' respective controllers in the mesh network are adapted to configure the lighting device in response to a controller of a master lighting device from the plurality of lighting devices:

generating random configuration information;

determine its illumination state information from the random configuration information; and communicate the determined illumination state information to a selection of lighting devices in the lighting system.

3. The lighting system of claim 1, wherein the at least some of the lighting devices' respective controllers in the mesh network are adapted to configure the lighting device in response to a controller of at least one of the lighting devices:

receiving seed configuration information from the system controller or from a user;

determine its illumination state information from the seed configuration information; and communicate the determined illumination state information to a selection of lighting devices in the lighting system.

4. The lighting system of claim 1, wherein at least part of the mesh network is a wireless mesh network.

5. The lighting system of claim 4, wherein the controllers of the plurality of lighting devices are communicatively coupled by the wireless mesh network and each is adapted to determine a relative position of a neighboring lighting device from a signal strength of a signal transmitted by the neighboring lighting device over the wireless mesh network.

6. The lighting system of claim 4, wherein at least some of the controllers of the plurality of lighting devices are communicatively coupled by the wireless mesh network and are adapted to communicate with neighboring lighting devices via an external bridge device.

7. The lighting system of claim 4, wherein the lighting devices' respective controllers are communicatively coupled by the wireless mesh network are adapted to periodically update the at least one of the lighting devices' neighboring lighting devices for communicating the determined illumination state information to.

8. The lighting system of claim 1, wherein the plurality of lighting devices have a fixed position relative to each other, and wherein at least some of the lighting devices' respective controllers in the mesh network are adapted to configure the lighting device by configuring the configurable dynamic lighting effect function based on illumination state information received from at least one of the at least some of the lighting devices' neighboring lighting devices and the at least some of the lighting devices' position relative to said at least one neighboring lighting device and/or to the system controller to facilitate deployment of the at least some of the lighting devices' portion of the dynamic lighting effect.

9. The lighting system of claim 8, wherein each lighting device is a tile-shaped lighting device having a major surface comprising a plurality of pixels, wherein the determined illumination state information comprises illumination characteristics of a set of pixels along an edge of the major surface adjacent to an edge of the major surface of a neighboring tile-shaped lighting device targeted to receive the determined illumination state information.

10. The lighting system of claim 9, the determined illumination state information further comprising tracking information of a displayed object moving across the major surface of the tile-shaped lighting device.

11. The lighting system of claim 1, wherein the respective controllers are further adapted to ignore illumination state information received from at least one of the at least some of the lighting devices' neighboring lighting devices in case of previously received illumination state information associated with the configurable dynamic lighting effect function.

12. The lighting system of claim 1, wherein at least some of the lighting devices further comprise an optical sensor coupled to its corresponding controller for determining illumination state information for a neighboring lighting device from the luminous output of the neighboring lighting device.

13. The lighting system of claim 1, wherein the respective controllers of the at least some of the lighting devices in the mesh network are further adapted to:

predict future illumination state information for a neighboring lighting device from the at least some of the lighting devices' determined illumination state information; and communicate the predicted future illumination state information to the neighboring lighting device.

14. The lighting system according to claim 1, wherein the controller of each lighting device is adapted to configure the lighting system by:

configuring a configurable dynamic lighting effect function based on illumination state information received from at least one of its neighboring lighting devices, the configurable dynamic lighting effect function defining the dynamic lighting effect to be deployed by the lighting system received from the system controller of the lighting system to facilitate deployment of its portion of the dynamic lighting effect; and determining its illumination state information from the configured configurable dynamic lighting effect function; and being further adapted to:

communicate the determined illumination state information to at least one of its neighboring lighting devices.

15. A method of configuring a lighting system for deploying dynamic lighting effects, the lighting system having a plurality of lighting devices, each lighting device being adapted to deploy a portion of a dynamic lighting effect and comprising a controller and a network communication module, the plurality of lighting devices being interconnected in a mesh network through their respective network communication modules such that each lighting device is communicatively coupled to at least one neighboring lighting device and adapted to communicate illumination state information to the at least one neighboring lighting device, and a system controller communicatively coupled to the mesh network and adapted to broadcast a configurable dynamic lighting effect function to the lighting devices in the mesh network, said dynamic lighting effect function defining the dynamic lighting effect to be deployed by the lighting system, the method comprising the steps of:

configuring at least some of the plurality of lighting devices is in the mesh network using their respective controllers, by configuring the configurable dynamic lighting effect function based on illumination state information received from at least one of the at least some of the plurality of lighting devices' neighboring lighting devices to facilitate deployment of its portion of the dynamic lighting effect;

determining the at least some of the plurality of lighting devices' illumination state information from the configured configurable dynamic lighting effect function; and communicating the determined illumination state information to at least one of the at least some of the plurality of lighting devices' neighboring lighting devices.

* * * * *